April 21, 1936. A. H. CRASKE 2,038,024
RECIPROCATING PISTON ENGINE
Filed Sept. 15, 1934
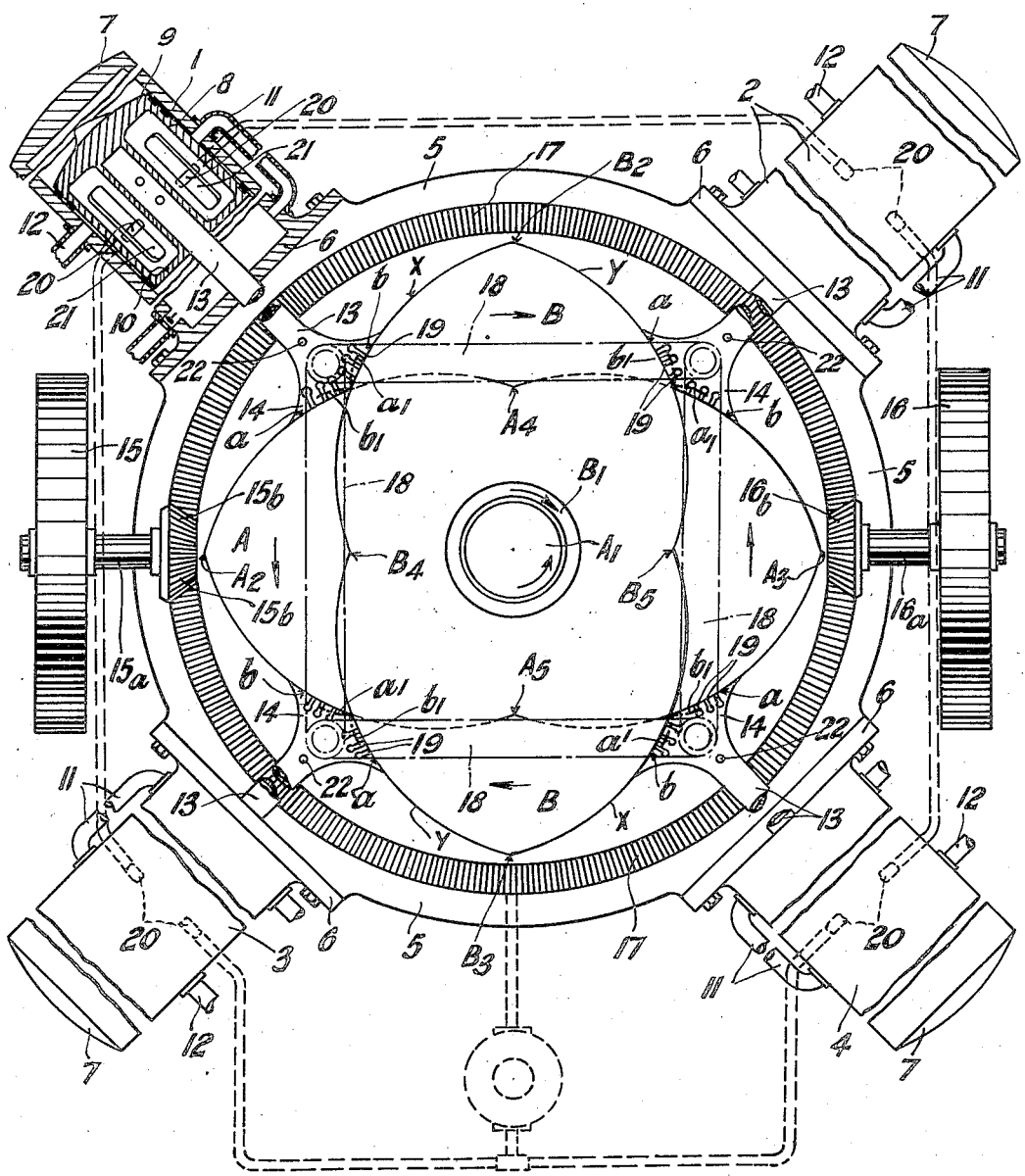
INVENTOR:—
Alfred Henry Craske
per. George Hughes
ATTORNEY.

UNITED STATES PATENT OFFICE 2,038,024

RECIPROCATING PISTON ENGINE

Alfred Henry Craske, Salisbury, England

Application September 15, 1934, Serial No. 744,121
In Great Britain September 20, 1933

1 Claim. (Cl. 74—55)

My present invention relates to means for converting motion in engines of the type in which a plurality of pistons reciprocating in radial cylinders are interconnected by a linkage system and are constructed to operate against cams to convert their reciprocating motion into rotary motion for driving one or more shafts. The object of my invention is to provide an improved mechanism whereby maximum use is made of the effective thrust of the pistons and in which the use of the crank shaft for converting the reciprocating motion into rotary motion is obviated. A further object of my present invention is to achieve static and dynamic balance and to balance the forces of torque reaction.

The present invention consists in providing a mechanical movement for converting the motion from a plurality of radially arranged reciprocating pistons to rotation of a shaft, and the said mechanical movement is effected by the said pistons carrying thrust members or slippers each of which simultaneously engages parts of a pair of cams impelled in opposite directions about a common axis by the thrust of the said pistons, links connecting the pistons for the purpose of transferring the working thrust of some of the pistons to a return or non-working stroke to the remainder of the pistons, and also to always maintain the pistons correctly located relatively to each other and to the pair of cams so that there is a direct working thrust on the cams when starting the engine or during idling, e. g. if the engine is being used to retard travel of a motor vehicle down a hill.

I have appended hereto a sheet of drawings illustrating somewhat diagrammatically an embodiment of my invention as applied to a two cycle internal combustion engine.

Referring to the drawing, the engine shown comprises a cylindrical or polygonal casing 5, which takes the place of the existing crank case and can be referred to as the main casing of the engine. Radiating symmetrically from this crank case are four cylinders indicated by reference numerals 1, 2, 3 and 4. The cylinders can be bolted to the casing 5 in any well known manner and they are provided with closed base plates 6 and with closed heads 7. Reciprocating in the cylinders 1 are pistons 8 each of which is of hollow cylindrical form closed at each end by a piston head 9 and a skirt plate 10. Any suitable means may be provided for admitting and exhausting the gases and for the purpose of simplicity I have shown side inlet and outlet ports 11 and 12 respectively, which are opened in well known manner when the piston reaches the end of its working stroke or at any other suitable stage well known to those acquainted with internal combustion engines.

The essence of the invention consists in the use of cams for converting reciprocating motion into rotary motion and various advantages arising out of the method of their use will be mentioned hereinafter. In the embodiment shown each piston carries a rigid, preferably co-axial piston rod 13, slidable through any suitable form of bush or guide formed in the cylinder base plate 6. Each piston rod 13 is of hollow cylindrical section and carries at its free end a suitable head, hereinafter referred to as a slipper, 14. Each slipper 14 co-operates with a pair of cams A and B both common in operation to the four pistons and mounted to rotate in opposite directions on a common axis. The cam member B is carried by a hollow shaft $B^1$ which rotates upon a shaft $A^1$ carrying the cam member A. Each cam member includes two substantially symmetrical lobes having outermost diametrically opposed crests $B^2$ and $B^3$ and $A^2$ and $A^3$ and arranged on planes at right angles to their innermost minimum radii parts $B^4$ and $B^5$ and $A^4$ and $A^5$.

Assuming that each pair of lobes is truly symmetrical it will be seen that each slipper 14 during all working positions engages symmetrical parts of the two cam parts A and B. In the arrangement shown when all of the pistons are at their mid-stroke positions the crests $A^2$ and $A^3$ are on a line at right angles to a crest $B^2$ and $B^3$ as shown in the drawing. Assuming that the pistons of the cylinders 1 to 4 are in the middle of their working strokes the crests $A^2$ and $B^2$ will be moved apart until the working strokes are completed when the said four crests will be on substantially a common plane, that is, the crest $A^2$ will be immediately in line with the crest $B^3$ and the crest $A^3$ will be immediately in line with the crest $B^2$. In order to carry the crests beyond this position, which in effect is a momentary dead centre position, any suitable inertia device may be employed and I prefer to employ a pair of balanced fly wheels 15 and 16 mounted on shafts $15a$ and $16a$ arranged on a common axis intersecting the axis of the shaft $A^1$. These fly wheels can be driven by a pair of annular gearings one of which is indicated by the reference numeral 17 and can be carried by the hollow shaft $B^1$, the other of which would be carried by the shaft $A^1$, these two gear rings rotating in opposite directions and meshing with pinions 15b and 16b fixed to the shaft 15a and 16a. Any suitable bearings can be provided in the casing 5 for the shafts 15a and 16a.

In practice it is desirable to have a positive transfer of motion from the pistons which are making their working strokes to the pistons which are making their return strokes and a suitable method of effecting this is to provide a lazy toggle type of link connection between the four piston rods 13. For this purpose four equally dimensioned links 18 can be connected to the slippers 14 of the pistons. In order to obtain proper balance it is preferred to duplicate the said links so that they are provided on opposite sides of the piston rods or alternatively an opposed pair of the said links can be provided on one side of the piston rods and the other pair on the opposite side.

In practice it is not desirable to have the four arcuate edges of each double lobe cam control symmetrical as in fact the rate of travel of the idle stroking pistons is not perfectly synchronous with the rate of travel of the working pistons although of course the mean time of each stroke is a common factor. To compensate for this one side of one lobe has a slightly different pitch to its arcuate surface than the other side and the actual configuration of the arcuate edges can be quite readily ascertained by plotting the various relative positions of the pistons in well known manner. It is probably sufficient to mention that the correspondingly shaped profile will be on opposite sides of the lobe as for example, the profiles X will be identical and the profiles Y will be identical.

The bearing surfaces of the slippers 14 will be so shaped that for all positions of the slippers they will have as large an area of contact as possible of the said profiles, particular care being taken that the maximum area of contact is during the working strokes.

Various means may be provided for facilitating easy working engagements of the slippers 14 and the cam and one employed is to provide in the operating edges of the slippers a plurality of keyhole shaped slots 19. These slots will impart a certain resiliency to the slippers and will also assist in proper distribution of the lubricating medium with which the casing 5 is charged to any suitable level.

It will be apparent that taking any given slipper it has two unilaterally disposed arcuate operative faces $a$ and $b$ respectively engaging the cam members A and B. This introduces the problem of determining two separate and distinct functions for each arcuate edge $a$ and $b$ because at the end of an idle stroke when the crests $A^2$ and $B^2$ can be overlapping, the profile Y of member B is just about to come into engagement with the arcuate edge $a$ but naturally not into contact with the same area of the edge $a$ as is employed during the working stroke. To summarize, during the idle stroke the profile Y will have to ride easily over a suitably shaped part of the edge $a$ and for this purpose the edge $a$ is formed with a unilaterally disposed part indicated by the dot and dash line $b^1$ which functions as a continuous part of the edge $b$ for the purpose of ensuring pushing contact between the edge Y and the appropriate slipper 14 during the idle stroke of piston. Naturally a correspondingly shaped part $a^1$ will have to be provided in continuity with the edge $a$ and unilaterally disposed in relation to the edge $b$.

It will be apparent from the foregoing that each slipper carries two working stroke arcuate edges $a$ and $b$ and two relatively unilateral idle stroke cam engaging edges $a^1$ and $b^1$. With high speed engines particularly where thrusting surfaces are in contact it is desirable to keep the working places as cool as possible and also to reduce as much as possible heat radiation and for this purpose I prefer to employ hollow pistons 8 as previously mentioned, the hollow pistons with closed ends enabling air to be circulated through the pistons, hollow piston rods and the casing 5, by providing in each cylinder any suitable number of air inlet ports 20 so located that they are not exposed to the combustion zone of the cylinder. Formed in the pistons are elongated slots 21 which admit extraneous air to the interior of the pistons. This air can be circulated through the hollow piston rods formed at their slippers with outlets 22 communicating freely with the interior of the casing 5 back to the ports 20. Air circulated in this manner will carry with it a proportion of lubricating oil in the form of a thin film or mist which will be distributed around the pistons and so facilitate lubrication.

It will be apparent that any modification of the foregoing arrangement of radial sets of cylinders can be provided. For example, if two sets of four rotary cylinders are disposed one behind the other a pair of one set and a pair of another set can drive a common centre shaft $A^1$, the remainder driving the hollow shaft $B^1$. For the purpose of driving aeroplane propellers such an arrangement can be usefully employed for driving on a common axis pusher and tractor propellers. Alternatively by mounting one propeller on the hollow shaft and one on the centre shaft they can both function as tractor or pusher propellers. Owing to the shafts rotating in opposite directions torque reaction is practically eliminated.

It will be apparent from the foregoing that by means of my invention two power shafts are provided which revolve in opposite directions, and are synchronized through suitable bevel gearing, so that they revolve at equal speeds. The cylinders are closed at their bases, but are provided with bushes to accommodate piston rods, each of which is fitted with a slipper at one end, and a piston head at the other.

The four slippers make continuous contact with the cam profiles and are inter-connected by means of links, or toggles.

When the cam-shafts revolve, the two slippers in opposition will move inwards in a straight line, and the links and cam profiles provide that the other pair move outwards in a straight line or vice versa.

On the working stroke, two opposed pistons exercise thrust in a line through the axes of the driven shafts, and the inward movement of the slippers has the effect of separating the cams until maximum displacement is reached at the end of the stroke. The thrust from the second pair of pistons then comes into effect, continuing the rotary movement and returning the first pair of pistons to their original position.

Theoretically, the slippers are in continuous engagement with the cam profiles, but actually, a working clearance is allowed in order to enable the cam crests to "change over" and clear the apices of the slippers at the end of the return stroke. At the "change over" point, the momentum of the mass continues the rotary movement. The design particularly lends itself to two cycle construction, in which case two opposed cylinders function simultaneously.

An advantage arising out of my invention is that owing to the constant axial thrust of the pistons during their working strokes the inner ends of the cylinders can be closed by the plates 6 and consequently the gases are compressed in the most effective zones and fed under compression to the combustion zones, the gases maintaining the temperature appropriate to the most efficient combustion up to the moment they enter the combustion zone. This is an obvious advantage over the existing practice of using crank case compression on two-stroke engines as the invention obviates the loss in compression and heat which must arise in transferring gases from the crank case to the cylinders and in which only crank case compression is available. Still further the combustion is much more effective because a greater proportion of the gases are combusted at the moment of sparking than is the case with crank case compression in which a large proportion of the gases in the combustion chamber are only exploded by the pressure set up by the partially ignited gas during sparking.

Should the inertia process be such as to set up a jarring or hammering action between the piston rods and the cams at the bottom of the working stroke, any suitable cushioning means may be provided to partially take the thrust of the pistons at the ends of the working strokes.

It will be appreciated that the slippers hereinbefore described may take various forms. For example, each slipper may be in the form of a roller or a co-axial pair of rollers and I wish it to be understood that the expression slipper contemplates any such of these alternative devices.

What I claim is:—

A device for converting motion consisting of a main casing, a pair of shafts both extending through said casing and mounted to rotate one about the other in opposite directions on a common axis, a pair of double-lobe cams secured one to each of the shafts and arranged close to each other, the lobe of each cam containing two substantially symmetrical arcuate outer edges, the lobes of each cam being substantially symmetrical in configuration, a number of cylinders secured to said casing and radiating from the common axis of said shafts, pistons reciprocating in said cylinders, means closing the inner ends of said cylinders and piston rods sliding through said closed ends, slippers carried by said piston rods and a pair of relatively fixed but laterally spaced cam engaging edges on each of said slippers adapted to simultaneously engage separate arcuate edges of both of the double-lobe cams, the double-lobe cams being arranged so that all their arcuate edges intersect during the predominating portion of each working stroke of the engine whereby the working strokes are applied to substantially symmetrical arcuate edges of the two double-lobe cams, and also corresponding edges of the double-lobe cams apply thrust to the piston during their idle strokes, and means maintaining the thrust members constantly in working engagement with the edges of the cams.

ALFRED HENRY CRASKE.